United States Patent [19]

Kakitani et al.

[11] Patent Number: 5,140,224
[45] Date of Patent: Aug. 18, 1992

[54] APPARATUS FOR OPERATING DISCHARGE LAMP

[75] Inventors: Tsutomu Kakitani; Kenichi Inui, both of Tokyo, Japan

[73] Assignee: Toshiba Lighting and Technology Corporation, Tokyo, Japan

[21] Appl. No.: 613,876

[22] PCT Filed: Mar. 27, 1990

[86] PCT No.: PCT/JP90/00404
§ 371 Date: Nov. 27, 1990
§ 102(e) Date: Nov. 27, 1990

[87] PCT Pub. No.: WO90/11672
PCT Pub. Date: Oct. 4, 1990

[30] Foreign Application Priority Data

Mar. 27, 1989 [JP] Japan ................................ 1-74346

[51] Int. Cl.⁵ .............................................. H05B 37/02
[52] U.S. Cl. .............................. 315/209 R; 315/219; 315/DIG. 7; 315/DIG. 4
[58] Field of Search ......... 315/209 R, 209 T, 209 CD, 315/307, 219, DIG. 4, DIG. 7; 331/113 A; 363/132

[56] References Cited

U.S. PATENT DOCUMENTS

| | | | |
|---|---|---|---|
| 3,263,122 | 7/1966 | Genuit | 315/DIG. 7 |
| 4,437,040 | 3/1984 | Bay | 315/209 R |
| 4,513,364 | 4/1985 | Nilssen | 331/113 A |
| 4,553,070 | 11/1985 | Sairanen | 315/209 R |
| 4,644,459 | 2/1987 | Nilssen | 331/113 A |
| 4,677,345 | 6/1987 | Nilssen | 315/209 R |

FOREIGN PATENT DOCUMENTS

| | | |
|---|---|---|
| 39-6868 | 3/1964 | Japan . |
| 39-13520 | 7/1964 | Japan . |
| 55-91100 | 6/1980 | Japan . |
| 57-101379 | 6/1982 | Japan . |
| 58-61597 | 4/1983 | Japan . |

Primary Examiner—Eugene R. Laroche
Assistant Examiner—A. Zarabian
Attorney, Agent, or Firm—Cushman, Darby & Cushman

[57] ABSTRACT

An apparatus for operating a discharge lamp is disclosed in which a voltage supplied from a commercial alternating current source is fed to a feedback-controlled, saturable current transformer having a primary winding, secondary windings and control winding and to a self-excited inverter circuit having a rectifier circuit. The discharge lame is lit upon receipt of an AC output obtained through reconversion by the inverter circuit. An impedance circuit varies an impedance so as to control a current in the control winding. The current in the control winding varies in accordance with a varied impedance to vary a saturation time of the variable current transformer in the inverter circuit and hence an output of the inverter circuit.

6 Claims, 8 Drawing Sheets

APPARATUS FOR OPERATING DISCHARGE LAMP

TECHNICAL FIELD

The present invention relates to an apparatus for operating a discharge lamp, and more particularly, to an apparatus for operating a discharge lamp using a inverter circuit which has a soft start function and can positively light a discharge lamp at a start time by providing a constant output in spite of a variation in voltage of a power supply.

BACKGROUND ART

An apparatus for operating a discharge lamp and lighting fixture having such an apparatus for discharge lamp are conventionally known, the lighting device being adapted to light a discharge lamp by rectifying an electric output voltage of a commercial AC power supply and then inverting the rectified power by an inverter circuit. In the apparatus and lighting fixture, if a power supply voltage applied to the lighting device varies to an extent of 10%, then an electric current supplied to the discharge lamp varies to an extent of about 15%. Therefore, an output varies greatly against a variation of an input voltage.

Such a discharge lamp cannot be fully lit with a inverter circuit output.

Further, an apparatus for operating a discharge lamp, having a soft start function, has to employ a large capacity resistor, and thereby becomes complex in its circuit arrangement. It has, therefore, been difficult to manufacture a low-cost device of a soft start function type, in consideration of manufacturing costs.

DISCLOSURE OF INVENTION

It is accordingly the object of the present invention to provide a low-cost apparatus for operating a discharge lamp which has a soft start function and can provide a constant output against a power supply voltage variation, and can also provide a constant light output on a discharge lamp and can positively light the discharge lamp at a lighting time by controlling the output.

According to the present invention, there is provided an apparatus for operating a discharge lamp comprising:

a self-excited type inverter circuit means including a DC power supply, a feedback-controlled, saturable current transformer having primary and secondary windings and control winding, and two switching elements, is adapted to alternately operate the two switching elements by an output of the secondary winding of the saturable current transformer;

discharge lamp means for receiving an AC output from the inverter circuit means to effect lighting; and output variable circuit means for varying an output of the inverter circuit means by varying a saturation time of the saturable current transformer in the inverter circuit means.

BEST MODE OF CARRYING OUT THE INVENTION

The embodiments of the present invention will be explained below with reference to the accompanying drawings.

Figure 1:
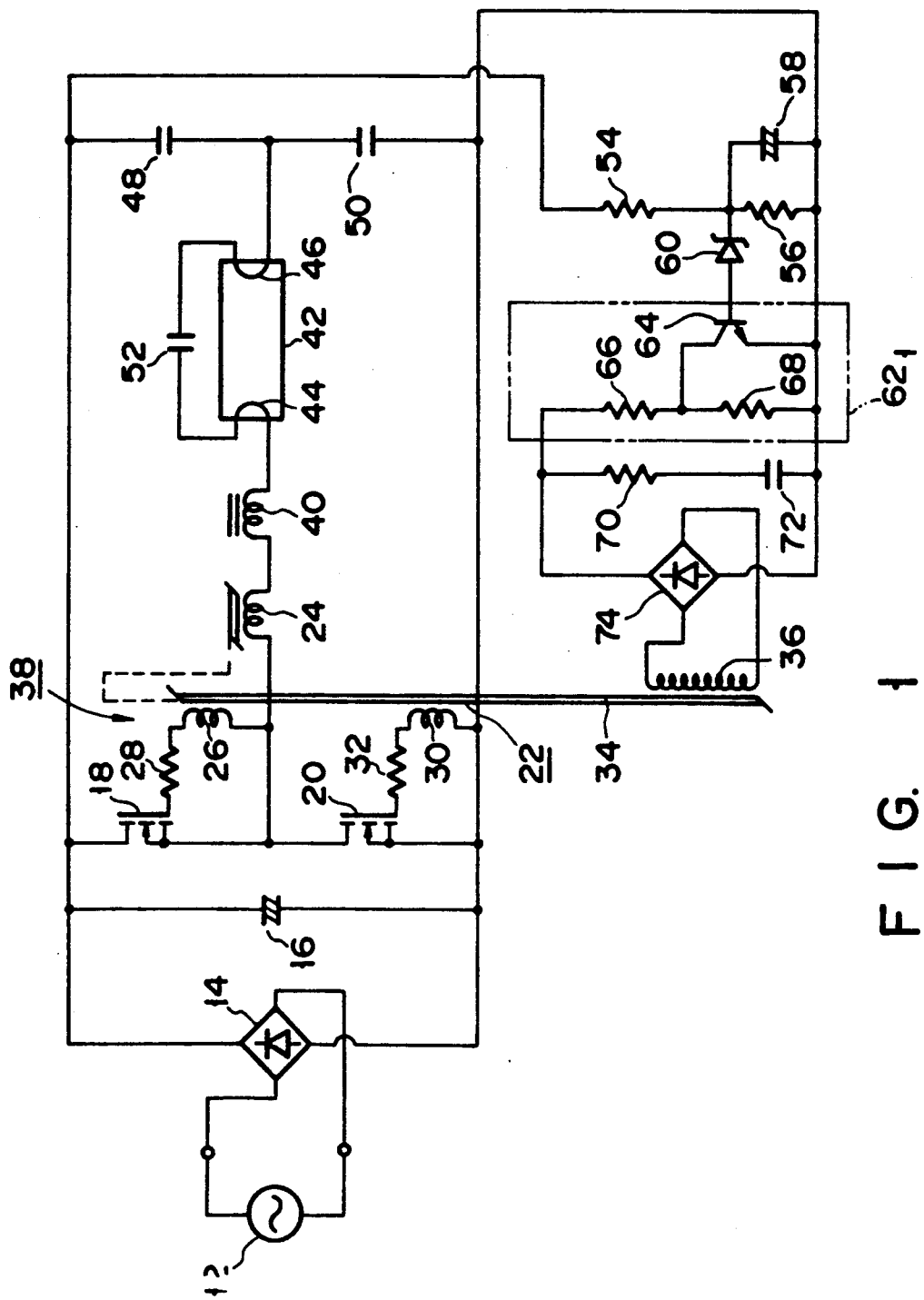
FIG. 1 is a circuit diagram showing an apparatus for operating a discharge lamp according to a first embodiment of the present invention.

In FIG. 1, reference numeral 12 represents a commercial AC power supply which is connected to an AC input terminal of a rectifying circuit 14. An electrolytic capacitor 16 for smoothing is connected between the DC output terminals of a rectifying circuit 14. Power MOS type field effect transistors 18 and 20 in series array have their drain-to-source circuits connected in parallel with the electrolytic capacitor 16 as shown in FIG. 1 and serve as switching elements. One end of a primary winding 24 of a saturable current transformer 22 for feedback control is connected to a connection point between the source of the field effect transistor 18 and the drain of the field effect transistor 20. One end of a first secondary winding 26 of the saturable current transformer 22 is connected to a connection point of the primary winding 24. The other end of the first secondary winding 26 is connected to the gate of the field effect transistor 18 via a resistor 28. Similarly, one end of a second secondary winding 30 of the saturable current transformer 22 is connected to the source of the field effect transistor 20. The other end of the secondary winding 30 is connected to the gate of the field effect transistor 20 via a resistor 32 and the saturable current transformer 22 is of such a type that the primary winding 24, first secondary winding 26, second secondary winding 30 and control winding 36 are magnetically coupled with a saturable core 34 as a common magnetic path. These elements, together with two field effect transistors 18 and 20, saturable current transformer 22 and so on, constitute a self-excited half-bridge type inverter circuit 38.

The other end of the primary winding 24 in the saturable current transformer 22 is connected via a reactor 40 to one filament 44 of a discharge lamp 42. The other filament 46 of the discharge lamp 42 is connected through both capacitors 48 and 50 to the DC output of the rectifier circuit 14. A starting capacitor 52 is connected between the two filaments 44 and 46.

A series circuit of voltage dividing resistors 54 and 56 is connected in parallel with the capacitors 48 and 50.

An electrolytic capacitor 58 for charging is connected in parallel with the resistor 56. A connection point of the voltage dividing resistors 54 and 56 is connected via a zener diode 60 to the base of a transistor 64 which provides an impedance circuit $62_1$ as a soft start circuit. The transistor 64 has its collector connected to a series circuit of resistors 66 and 68 and its emitter connected to a negative output terminal of the rectifier circuit 14, that is, the collector-to emitter circuit of the transistor 64 is connected to the resistor 68.

A series-circuit of a resistor 70 and capacitor 72 is connected to both the ends of the series-circuit of the resistors 66 and 68, that is, to an output terminal of the impedance circuit $62_1$. Further, the DC output terminal of a rectifier 74 is connected between both the ends of the aforementioned series-circuit. The control winding 36 of the saturable current transformer 22 is connected to the AC input terminal of the rectifier circuit 74.

The operation of the first embodiment will be explained below.

A commercial alternating current supplied from the commercial AC power supply 12 is rectified and smoothed by the rectifier circuit 14 and field capacitor 16. Then electric current is supplied to the primary winding 24 of the saturable current transformer 22 and, when the saturable core is saturated, is inverted at the current transformer. Upon repeated inversion resulting from the saturation, the field effect transistors 18 and 20 are alternately rendered on and off for each inversion. By so doing, the direct current is converted to alternating current to enable the discharge lamp 42 to be turned on.

During a period of time (about 0.5 to 1 second) in which the electrolytic capacitor 58 is charged at a starting time, a potential on the connection point between the resistors 54 and 56 is placed at a lower level than a zener voltage on the zener diode 60. For this reason, the transistor 64 is held in the off state since a base current is supplied to the base of the transistor 64. Thus an electric current flowing through the resistor 68 in the impedance circuit $62_1$ is not bypassed, increasing a closed circuit's impedance coupled to the DC output terminal of the rectifier circuit 74. The output frequency becomes high, i.e., approximately 0.5 to 1 second, which is required for charging the electrolytic capacitor 58 at the starting time, is shortened in order to perform a soft start.

Upon the charging of the electrolytic capacitor 58, a potential on the connection point between the resistors 54 and 56 becomes a higher level than a zener voltage across the zener diode 60. Then a base current is supplied to the base of the transistor 64 and a current across the resistor 68 is bypassed to the transistor 64.

Figure 2:
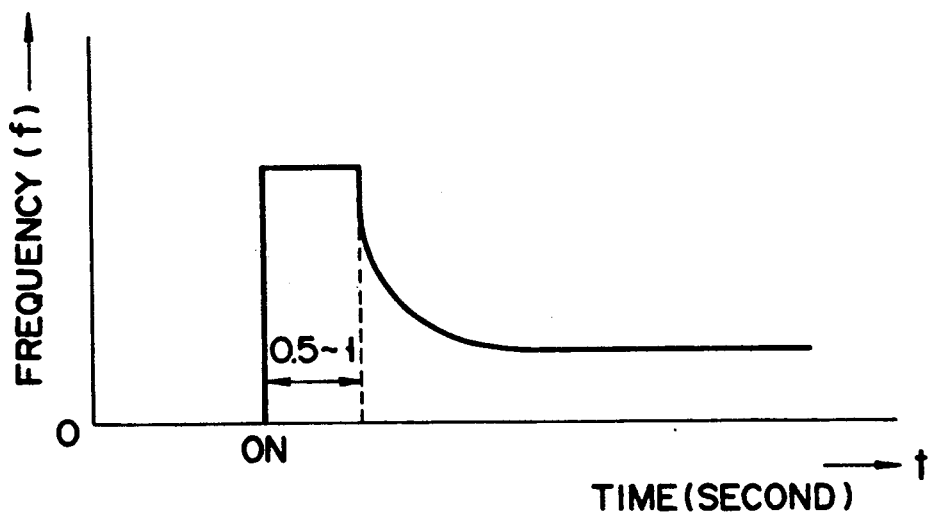
FIG. 2 is a timing diagram for explaining the operation of a soft start circuit in the apparatus.

Thus an impedance in the closed path connected to the DC output terminal of the rectifier circuit 74 is made smaller, thus, shortening the saturation time of the saturable core 34. In this way, as shown in FIG. 2, the output frequency is lowered and the output is raised, enabling the discharge lamp 42 to be fully lit.

Figure 3:
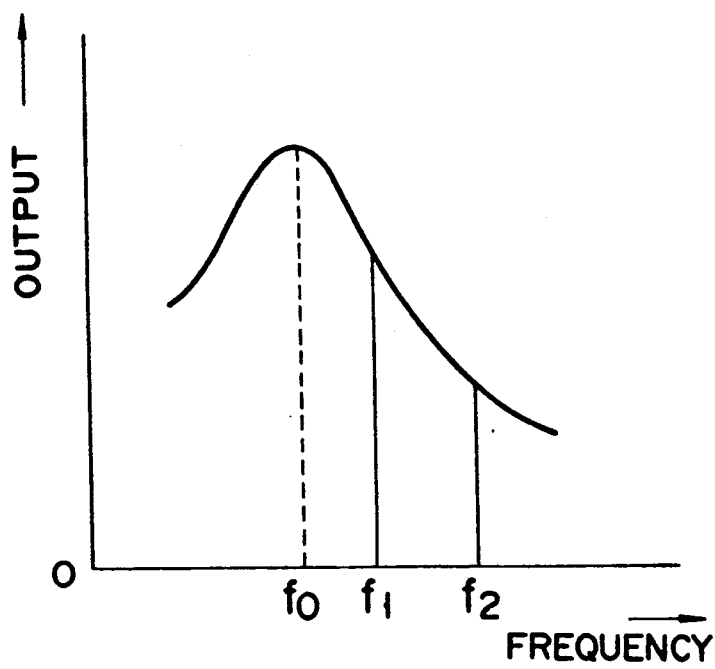
FIG. 3 is a characteristic curve showing a frequency-to-output relation of an inverter circuit in the apparatus of FIG. 1.

The load circuit constitutes an LC resonant circuit constructed of the primary winding of the saturable current transformer 22, reactor 40 and capacitors 48 and 50. The frequency-to-output relation is represented as shown in FIG. 3. Let it be assumed that a greater impedance is set for the maximal output value (frequency f0) of the LC resonant circuit and, in this case, the frequency is made at, for example, f2. Then an output involved is lowered to a dimmed state. On the other hand, let it be assumed that the frequency is made at, for example f1 against a smaller frequency. Then an output is made high compared with the frequency f2. It will be seen that a fully lighted state is obtained.

An apparatus for operating a discharge lamp according to a second embodiment of the present invention will be explained below with reference to FIG. 4.

Figure 4:
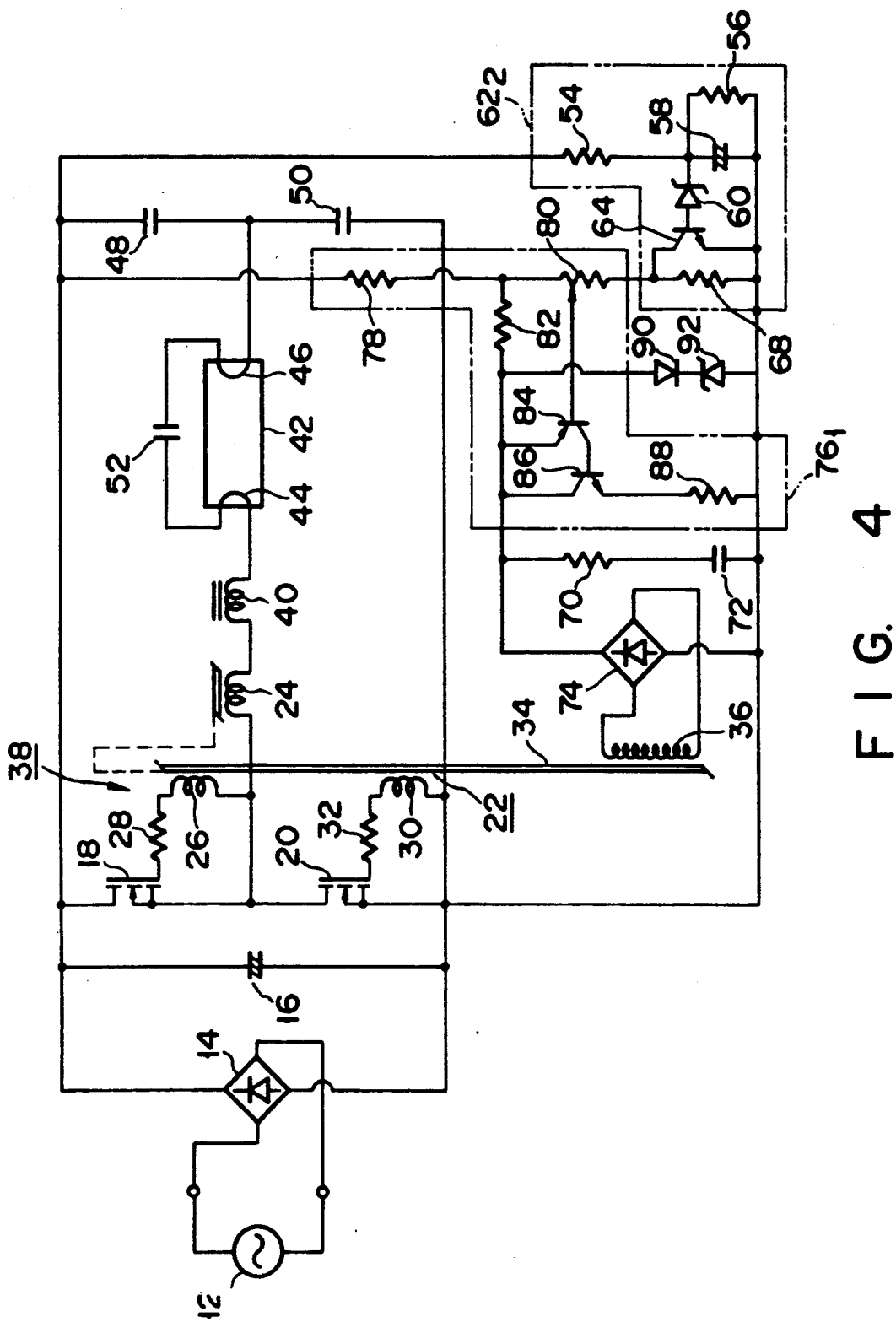
FIG. 4 is a circuit diagram showing an apparatus for operating discharge lamp according to a second embodiment of the present invention.

The apparatus for operating a discharge lamp as shown in FIG. 4 is of such a type that a regulation improving circuit $76_1$ acting as an output variable circuit and constant output circuit is added to the apparatus as shown in FIG. 4. The same reference numerals are employed to designate parts or elements corresponding to those shown in FIG. 4 and any further explanation is, therefore, omitted.

In the arrangement shown in FIG. 4, a series-circuit of a resistor 78 and variable resistor 80 is connected between a positive output terminal of a rectifier circuit 14 and a connection point between the collector of a transistor 64 and a resistor 68. A positive output terminal, that is a DC output terminal, of a rectifier circuit 74, is connected via a resistor 82 to a connection point between the resistor 78 and the variable resistor 80. The emitter of a transistor 84 and collector of a transistor 86 are connected between the resistor 82 and the DC output terminal of the rectifier circuit 74. The transistor has its base connected to a tap of the variable resistor 80 and its collector connected to the base of the transistor 86. Further, the emitter of the transistor 86 is connected via a resistor 88 to a negative output terminal, that is a DC output terminal, of the rectifier circuit 74. A diode 90 and zener diode 92 are connected, in a indicated polarity relation, between the positive output terminal, that is the DC output terminal, of the rectifier circuit 74 and a common point between the resistor 68 and the emitter of a transistor 64.

Here, resistors 54, 56 and 68, electrolytic capacitor 58, transistor 64 and zener diode 60 provide an impedance circuit $62_2$, serving as a soft start circuit. The resistors 78, 82 and 88, variable resistor 80 and transistors 84 and 86 constitute a regulation improving circuit $76_1$ serving as both the aforementioned output variable circuit and the aforementioned constant output circuit.

The operation of the discharge lamp lighting device according to the second embodiment of the present invention will be explained below.

Even in the second embodiment, a self-excited half bridge type inverter circuit 38 converts, as in the first embodiment, direct current to alternating current. If, at this time, the resistive value of the variable resistor 80 varies, the base currents of the transistors 84 and 86 vary, varying a saturation time for a saturation core 34 and a frequency. Therefore, an output of the inverter circuit 38 varies in accordance with a variation in a resistive value of the variable resistor 80.

At the starting time, a predetermined period of time electrolytic capacitor 58 takes to charge the allows a higher impedance to be achieved in a closed path on the output side of the rectifier circuit 74. By so doing, a higher frequency is involved at the inverter circuit 38, heating filaments 44 and 46 of discharge lamp 42 at a low output level. When the transistor 64 is turned ON owing to the charging of the electrolytic capacitor 58, a lower impedance is involved in the closed path on the DC output side of the rectifier circuit 74, causing the frequency to be lowered. At a time of a normal output level, the discharge lamp 42 is lit.

With an input voltage rise on the inverter circuit 38, an input base current is lowered in the transistor 86. Therefore, an impedance rises in the closed path across the DC output terminals of the rectifier circuit 74, shortening a saturation time for the saturable core 34. By so doing, a higher frequency is involved on the inverter circuit 38 in which case even a rise of an input voltage causes no rise in an output level of the inverter circuit 38.

On the other hand, a drop in the input voltage of the inverter circuit 38 causes an increase in an input base current of the transistor 86. Then a lower impedance is involved in the closed path between the DC output terminals of the saturable core 34. By doing so, a lower frequency is involved for the inverter circuit 38, not lowering an output level of the inverter circuit 38 even when an input voltage is lowered.

It follows that even a variation in an input voltage level of the inverter circuit 38 causes no variation in the output voltage level. Thus an electric current supplied to a discharge lamp 42 can be held at a predetermined brightness level without being varied.

Figure 5:
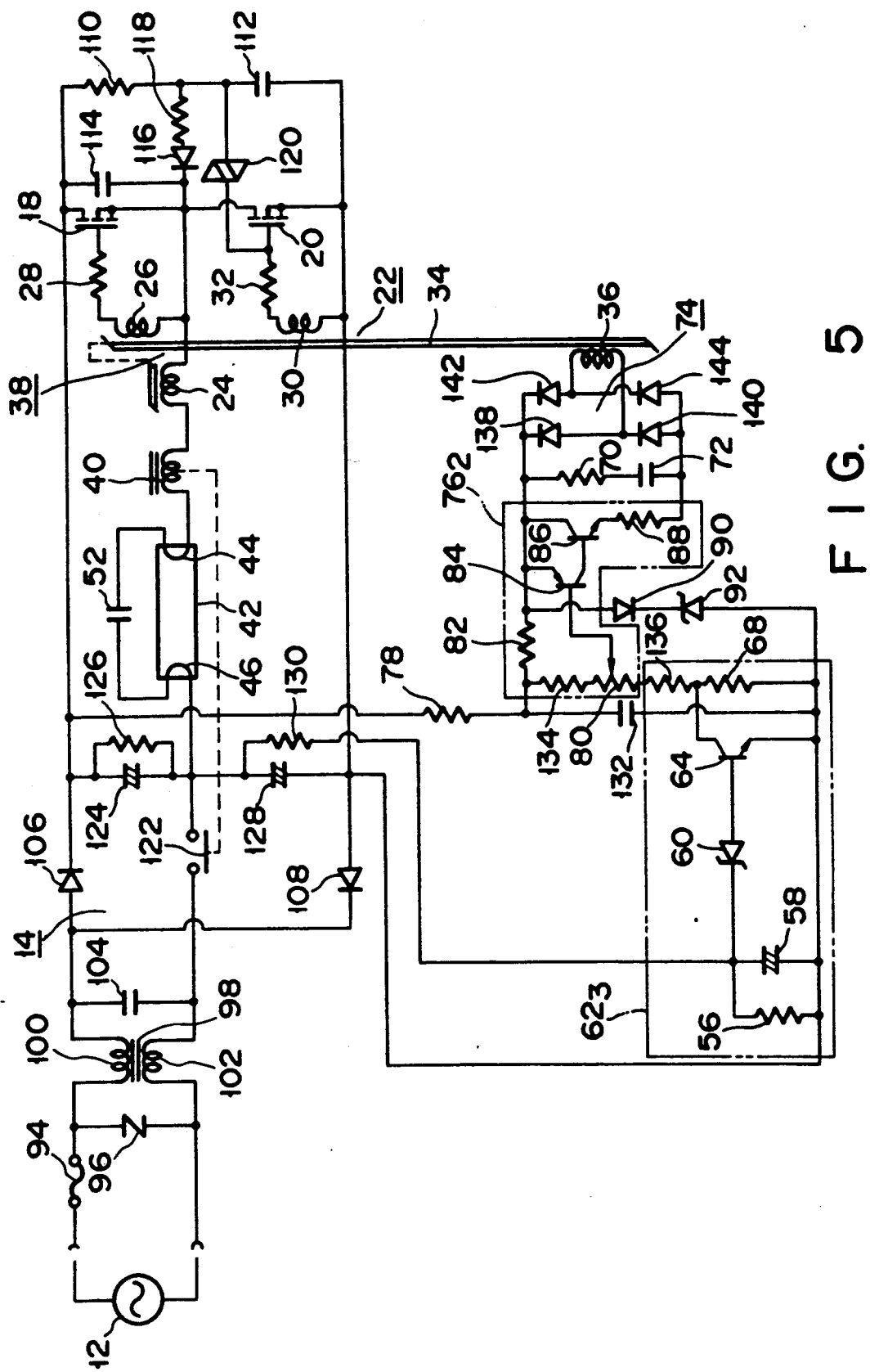
FIG. 5 is a circuit diagram showing an apparatus for operating discharge lamp according to a third embodiment of the present invention.

An apparatus for operating discharge lamp according to a third embodiment of the present invention will be explained below with reference to FIG. 5. In FIG. 5, the same reference numerals are employed to designate parts or elements corresponding to those shown in FIGS. 1 and 4 and any further explanation is, therefore, omitted for brevity's sake.

A varistor 96 is connected between both ends of a commercial AC power supply 12 via a fuse 94. First and second windings 100 and 102 of respectively, a transformer 98 for noise prevention are connected, at one end, across the varistor 96. A capacitor 104 is connected to the other end of the first and second windings 100 and 102 of the transformer. The first winding 100 in the transformer is connected at the other end to the drain of an field effect transistor 18 via a diode 106 of polarities indicated and to the source of an electrolytic effect transistor 20 via diode 108 of polarities indicated. That is, the diodes 106 and 108 are connected cathode-to-anode and constitute a rectifier circuit 14 as set out above.

A series-circuit of a resistor 110 and capacitor 112 is connected between the drain of the electrolytic effect transistor 18 and the source of the electrolytic effect transistor 20. A capacitor 114 is connected between the drain and the source of the electrolytic effect transistor 18. A series-circuit of a resistor 118 and diode 116 of polarities indicated in FIG. 5 is connected between the source and the electrolytic effect transistor 18 and a connection point between the resistor 110 and the capacitor 112. A bidirectional two-terminal thyristor (SSS) 120 is connected between the gate of the electrolytic effect transistor 20 and a connection point between the resistor 110 and the capacitor 112.

A heat-sensitive switch 122 which is thermally coupled to a reactor 40 is connected between the other terminal of the second winding 102 of the transformer 98 and a filament 46 of a discharge lamp 42. The heat-sensitive switch 122 serves to enable the commercial AC power supply 12 to be cut off from the inverter circuit 38 when an abnormal excess current flows through the circuit involved. A parallel-circuit of an electrolytic capacitor 124 and resistor 126 is connected between the cathode of the diode 106 and the filament 46. Similarly, an electrolytic capacitor 128 is connected between the anode of a diode 108 and the filament 46.

A resistor 130 is connected between a connection point between the electrolytic capacitors 124 and 128 and a connection point between a resistor 56 and a zener diode 60. A series circuit of a resistor 78 and capacitor 132 is connected between the cathode of the diode 106 and the drain of transistor 18 and has its connection point connected via a resistor 134 to one end of a variable resistor 80. The resistor 80 is connected, at the other end, to a connection point between the collector of a transistor 64 and a resistor 68 via a resistor 136. Here, resistors 56, 68 and 136, electrolytic capacitor 58, transistor 64 and zener diode 60 provide an impedance circuit $62_3$ functioning as a soft start circuit. Resistors 82, 88 and 134, variable resistor 80 and transistors 84 and 86 provide a regulation improving circuit $76_2$ serving as an output variable circuit and constant output circuit.

Further, a series-circuit of diodes 138 and 140 and that of diodes 142 and 144 are connected in parallel with the series-circuit of a resistor 70 and capacitor 72, these diodes in these series circuits having their polarities indicated in FIG. 5 and serving as a rectifier circuit 74. A control winding 36 as set out above has one end connected between diodes 138 and 140 and the other end connected between diodes 142 and 144.

The operation of the third embodiment will be explained below.

A commercial alternating current is supplied from the commercial AC power supply 12 to the rectifying circuit 14 where it is rectified. A voltage is alternately applied to the electrolytic effect transistors 18 and 20 through first and second secondary windings 26 and 30 in a saturable current transformer 22. In this way, the field effect transistors 18 and 20 are alternately operated. In a predetermined period of time up to the charging of the electrolytic capacitor 58 at a starting time, a greater impedance is involved in a closed circuit on the output side of the rectifier circuit 74 because the transistor 64 is not turned ON. Thus the output frequency of the inverter circuit is lowered, enabling the discharge lamp 42 to be operated in a soft start fashion. In a normal time following the charging of the electrolytic capacitor 58, the transistor 64 is turned ON, allowing an electric current in the resistor 68 to be bypassed to the transistor 64. By doing so, an impedance is lowered in the closed circuit on the DC output of the rectified circuit 74 and an output level of the inverter circuit 38 is increased, enabling the discharge lamp 42 to be lit in a normal fashion.

At this time, the saturation time of the saturable core 34 varies by varying a resistive value for the transistor 84 connected to the variable resistor 80. It is thus possible to vary the output of the inverter circuit 38.

With a power supply voltage raised, an equivalent resistive value is enhanced in the collector-to-emitter circuit of the transistor 86 and an impedance is raised in the closed path on the DC output terminal of the rectifier circuit 74. Then the saturation time is shortened in the saturable core 34 and a high frequency is involved at the inverter circuit 38, producing a low output. With the power supply voltage lowered, on the other hand, an equivalent resistive value is lowered in the collector-to-emitter circuit of the transistor 8 and an impedance is lowered in the closed path on the DC output end of the rectifier circuit 74. The time in which the saturable core is saturated is lengthened and the frequency is lowered in the inverter circuit 38, producing a high output level.

Even when a power supply voltage varies, an input current of the discharge lamp 42 is held at a predetermined level by making an output of the inverter circuit 38 constant. It is thus possible to obtain constant brightness on the discharge lamp.

Figure 6:
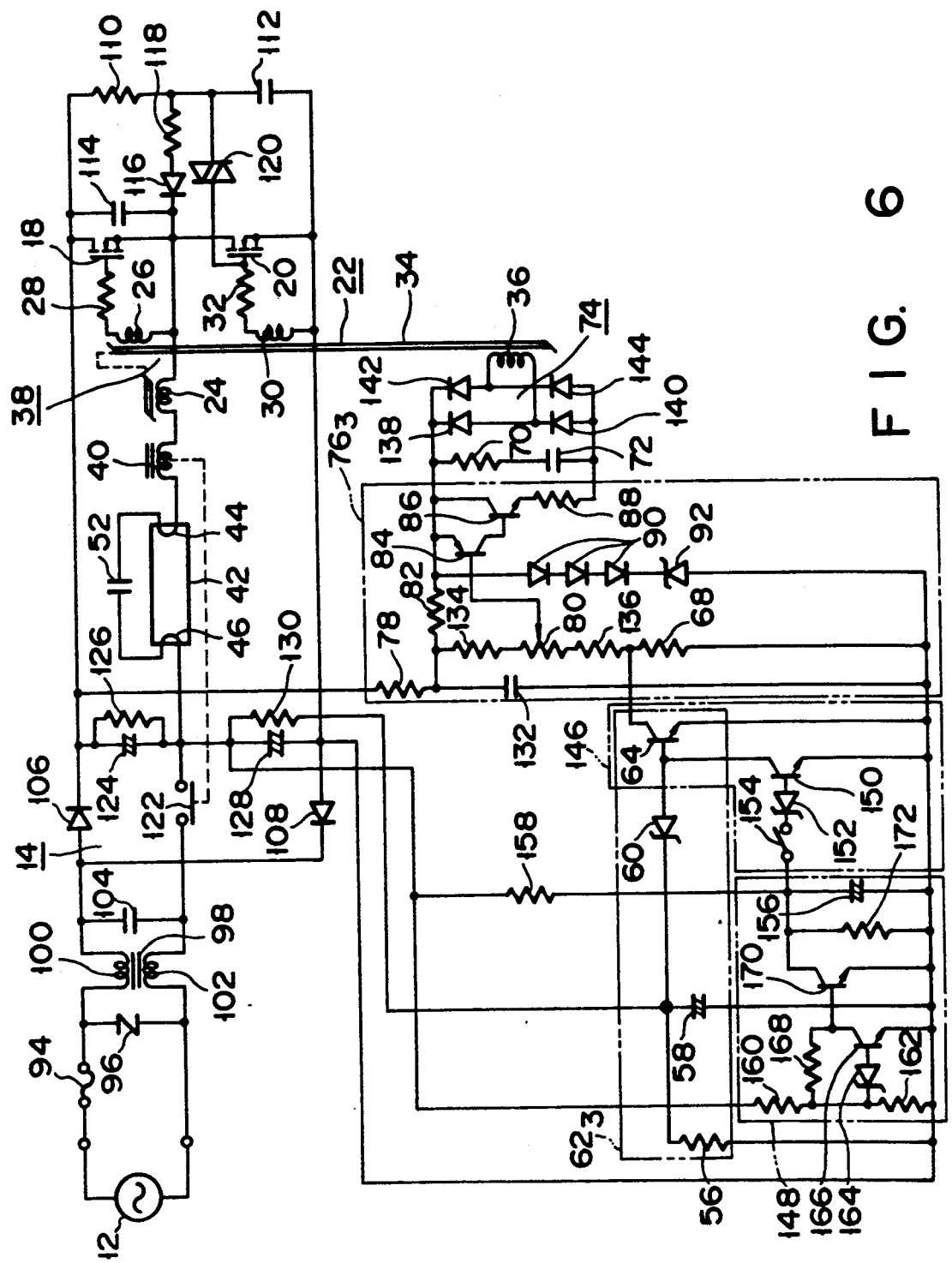
FIG. 6 is a circuit diagram showing an apparatus for operating discharge lamp according to a fourth embodiment of the present invention.

A fourth embodiment of the present invention will be explained below with reference to FIG. 6. In FIG. 6, the same reference numerals are employed to designate parts or elements corresponding to those shown in FIGS. 1, 4 and 5 and any further explanation is omitted for brevity's sake.

The fourth embodiment comprises the apparatus of the third embodiment (FIG. 5) and a dimmed light switching circuit 146 and full light start circuit 148. Stated in another way, the dimmer circuit 146 includes a transistor 150 having its collector and emitter connected to the base and emitter of a transistor 64 in a soft start circuit $62_3$. A series-circuit of a zener diode 152 and switch 154 and an electrolytic capacitor 156 in a full-light start circuit 148 are connected, as shown in FIG. 6, between the base and the emitter of the transistor 150 as shown in FIG. 6.

In the full-light start circuit 148, a resistor 158 is connected between an electrolytic capacitor 156 and a connection point of electrolytic capacitors 124 and 128 and a series-circuit of resistors 160 and 162 is connected across the electrolytic capacitor 128. The base of the transistor 166 is connected to a connection point between the resistors 160 and 162 via a zener diode 164. The collector of the transistor 166 is connected via resistor 168 to another connection point between resistors 160 and 162 and to the base of the transistor 170. The emitter of the transistor 166 is connected together with the emitter of the transistor 170 to a connection point of the electrolytic capacitor 128 and the anode of diode 108. The collector of the transistor 170 is connected to the switch 154, and a resistor 172 is connected between the collector and the emitter of the transistor 170.

Even in the apparatus for operating a discharge lamp thus arranged, a self-excited half bridge circuit 38 converts direct current to alternating current as in the case of the apparatus shown in FIG. 5. With the switch 154 OFF, no current is supplied to the base of the transistor 150 and the transistor is consequently turned OFF. By so doing, a base current is supplied to the transistor 64, causing transistor 64 to be turned ON. A current in the resistor 68 is bypassed to the transistor 64. Then the impedance of the impedance circuit $76_3$ is lowered and the frequency involved is lowered, lighting a discharge lamp 42 in a full light fashion.

With the switch 154 ON, on the other hand, a current is supplied to the base of the transistor 150, enabling the transistor 150 to be turned ON. The base current of the transistor 64 is therefore then bypassed. The transistor 64 is turned OFF and a higher impedance is involved in the impedance circuit $76_3$. A high impedance leads to a decrease in output level of the discharge lamp 42. In this way, light is dimmed at two steps by turning the switch 154 ON and OFF.

Figure 7:
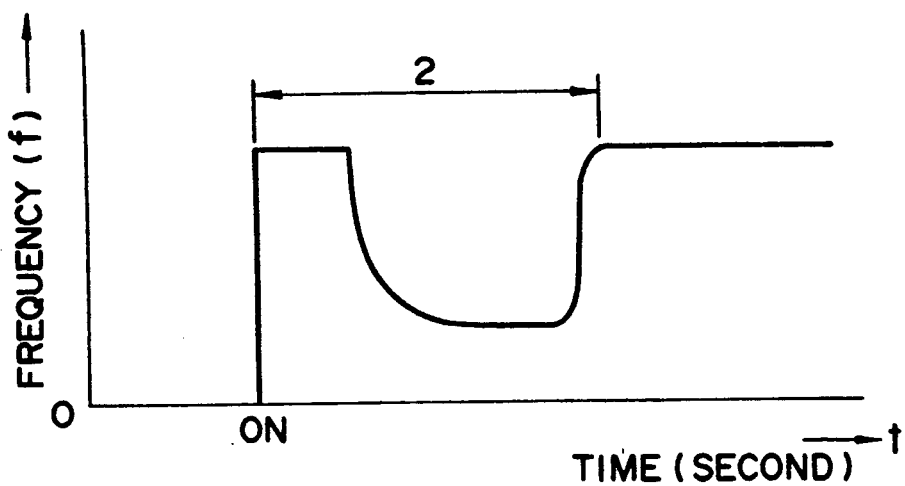
FIG. 7 is a view showing a soft start operation in full light and dimmed light on the apparatus of FIG. 6.
Figure 8:
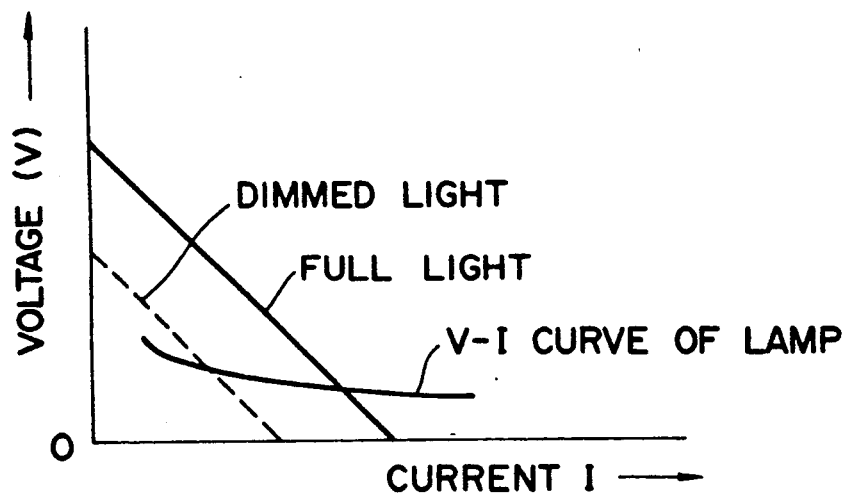
FIG. 8 is a characteristic curve showing a voltage-current relation of the apparatus of FIG. 6.

When the discharge lamp 42 is started, a soft start is carried out. Since the electrolytic capacitor 156 is not charged, even if, for example, the switch 154 is turned ON, the transistor 150 is not turned ON until a voltage on the electrolytic capacitor 156 exceeds a zener voltage on the zener diode 152. For this reason, the discharge lamp is operated necessarily in a full-light start fashion for about 2 seconds after the discharge lamp has been started as shown in FIG. 7.

According to the fourth embodiment, even if the discharge lamp 42 is to be lit in a dimmed fashion with, for example, the switch 154 ON, it is started necessarily in a full-light fashion and there is no drop in a secondary voltage, improving the lamp's starting ability.

Figure 9:
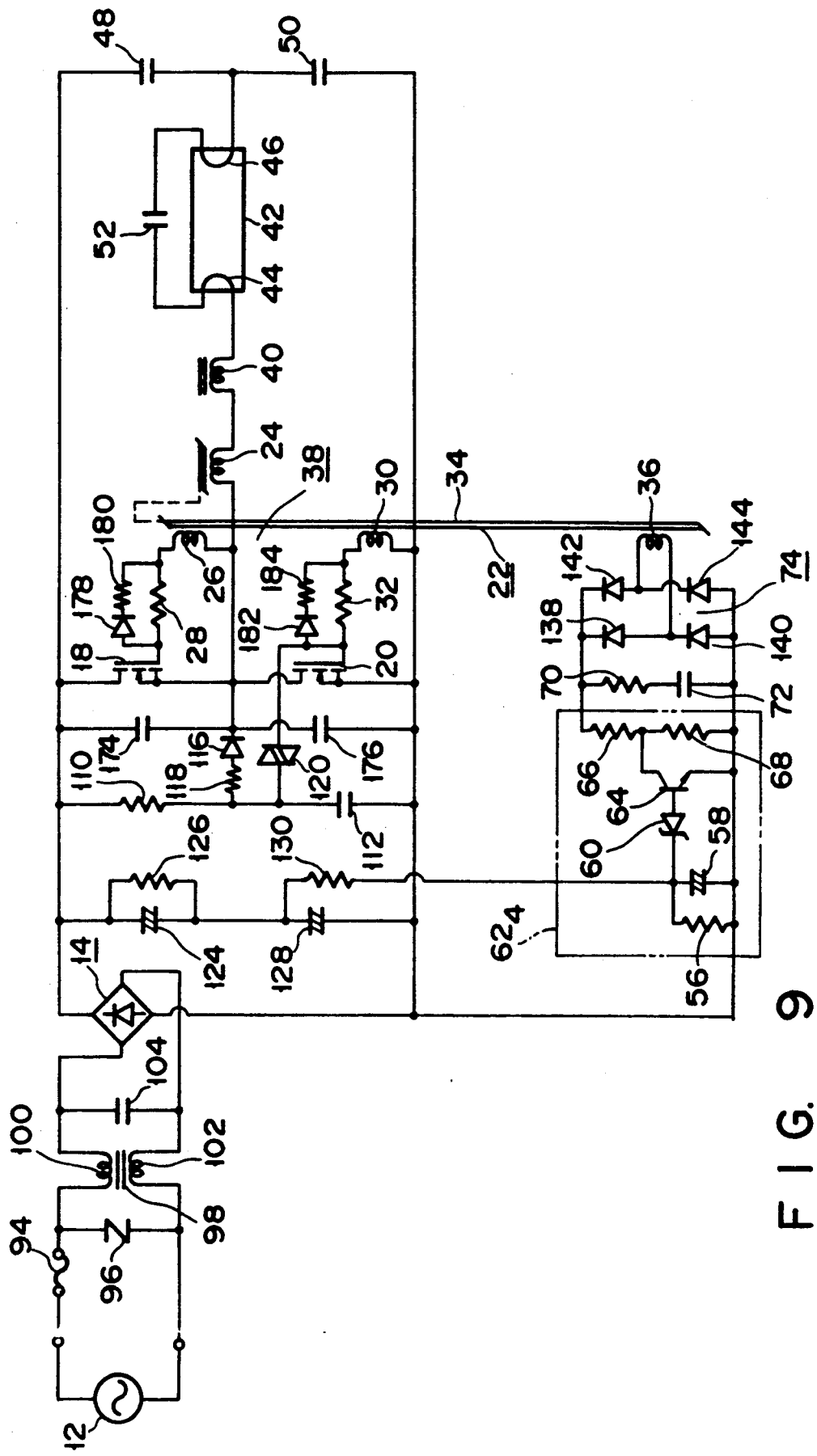
FIG. 9 is a circuit diagram showing an apparatus for operating discharge lamp according to a fifth embodiment of the present invention.

A fifth embodiment of the present invention will be explained below with reference to FIG. 9. In FIG. 9, the same reference numerals are employed to designate parts or elements corresponding to those shown in FIGS. 1 and 4 to 6 and any further explanation is omitted for brevity's sake.

In FIG. 9, a capacitor 174 is connected between the drain and the source of field effect transistor 18. Similarly, a capacitor 176 is connected across the drain and the source of field effect transistor 20. A series-circuit of a diode 178 and resistor 180 is connected in parallel with a resistor 28 which is connected between the gate of the field effect transistor 18 and a first secondary winding 26 of a saturable current transformer 22. A series-circuit of a diode 182 and resistor 184 is connected in parallel with a resistor 32 which is connected between a second secondary winding 30 of the saturable current transformer 22 and the gate of the field effect transistor 20.

The operation of the fifth embodiment will be explained below.

A commercial alternating current is supplied from a commercial AC power supply 12 to a rectifier circuit 14 where it is rectified. A corresponding current is converted to alternating current by the operation of two field effect transistors 18 and 20. In a soft start circuit $62_4$, since a transistor 64 is turned OFF until an electrolytic capacitor 58 is charged at a start time, an impedance is enhanced in a closed path on the output side of a rectifier circuit 74. Thus the saturation time of a saturable core 34 is hastened and the output frequency of an impedance circuit inverter circuit 38 becomes higher, suppressing the output of an inverter circuit 38 at a lower level. As a result, a discharge lamp 42 is started in a soft start fashion. Thereafter, upon the charging of the electrolytic capacitor 58, the transistor 64 is turned ON and a lower impedance is produced in a closed path on the DC output of the rectifier circuit 74. The saturation of the core 34 takes a longer period of time. In this way, the frequency involved is lowered and the inverter circuit 38 produces a normal output level. The discharge lamp 42 is lit at a normal, predetermined brightness level.

Figure 10:
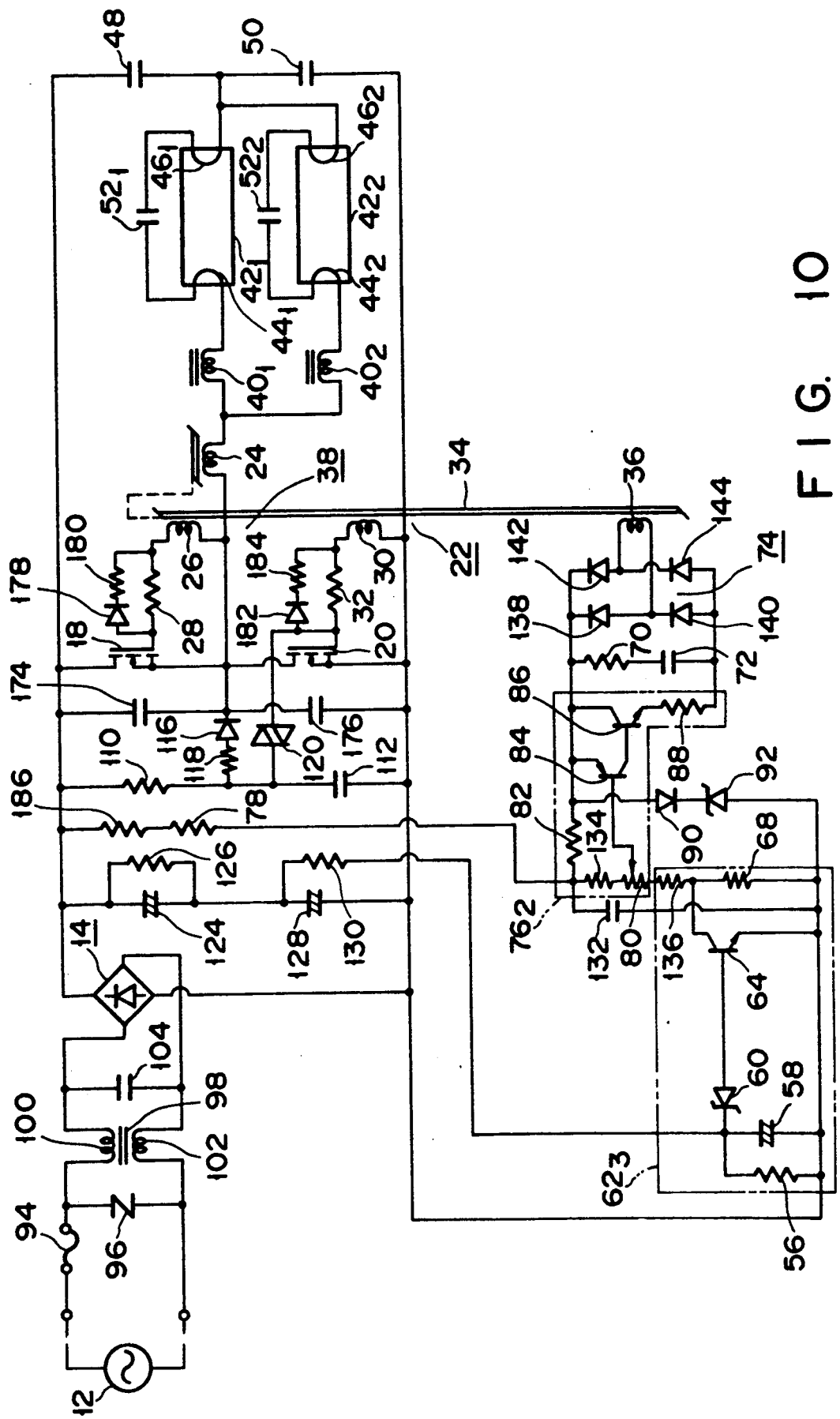
FIG. 10 is a circuit diagram showing an apparatus for operating discharge lamp according to a sixth embodiment of the present invention.

A sixth embodiment of the present invention will be explained below with reference to FIG. 10. In FIG. 10, the same reference numeral is employed to designate parts or elements corresponding to those of the preceding embodiments and any further explanation is omitted for brevity's sake.

An apparatus for operating a discharge lamp as shown in FIG. 10 includes a plurality (2 in this embodiment) of discharge lamps in place of the discharge lamp 42 in the embodiment shown in FIG. 9 and a regulation improving circuit $76_2$ connected between the DC output terminals of a rectifier circuit 14 via resistors 186 and 78 and resistors 136 and 68. That is, a discharge lamp $42_1$ is connected to a starting capacitor $52_1$ provided between two filaments $44_1$ and $46_1$ and a discharge lamp $42_2$ is connected to a starting capacitor $52_2$ provided between two filaments $44_2$ and $46_2$. The discharge lamps $42_1$ and $42_2$ are connected, in parallel fashion, between a connection point, on one hand, of capacitors 48 and 50 and reactors 40$_1$ and 40$_2$, on the other hand, which are connected to the other end of a primary winding 24 of a saturable current transformer 22.

The operation of the sixth embodiment is the same as that of the fifth embodiment. It is thus possible to perform a soft start. The saturation time of a saturable core 34 varies by varying a base current in the transistor 84 through a variable resistor 80. The output of an inverter circuit 38 can vary by varying the frequency for the inverter circuit 38. Further, a rise in input voltage of the inverter circuit 38 leads to a decrease in the base current of a transistor 86 and a rise of impedance in the closed path on the output side of the rectifier circuit 74. Therefore, the saturation of the saturable core 34 is hastened and the impedance circuit 62$_3$ produces a higher output frequency. The output level of the inverter circuit 38 is suppressed. Upon a decline in an input voltage of the inverter circuit 38, on the other hand, the input base current of the transistor 86 is increased and a lower impedance is produced in the closed path on the DC output of a rectifier circuit 74, lengthening the saturation time of the saturable core 34. Therefore, the frequency involved is lowered and an output level of the inverter circuit 38 is not decreased. Even if the input voltage largely varies, the variation of an output involved can be lowered.

In the aforementioned apparatus for operating discharge lamp, when the variation of an input voltage is 10%, a variation in a lamp current is about 5% and the variation of the lamp current can be suppressed to one-third that of a conventional counterpart.

The present invention cannot be restricted to the shown and above-described embodiments only. Various changes or modifications of the present invention can be made without departing from the spirit and scope of the present invention. Although an apparatus for operating a discharge lamp of the present invention can be built in a lighting fixture, such as a fluorescent lamp or a gas discharge lamp which includes a discharge lamp.

As set forth above, according to the present invention, an apparatus for operating discharge lamp of less cost can be provided which can be driven in a soft start fashion, provide a constant output and constant light output against the variation of a power supply voltage, and positively light a discharge lamp by controlling an output level.

We claim:

1. An apparatus for operating a discharge lamp assembly comprising:
   a self-excited inverter circuit means which comprises:
   a DC power supply,
   a feedback-controlled, saturable current transformer having a primarily winding, and secondary windings, and a control winding, and
   a plurality of switching elements having control electrodes connected to said secondary windings and current conducting electrodes connected between said DC power supply and said primary winding to alternately conduct in response to outputs of said secondary windings;
   said self-excited inverter circuit means for converting a direct current to an alternating current;
   a discharge lamp connected to an AC output from said inverter circuit means; and
   an output variable circuit means, connected to said control winding, for varying a current in said control winding to vary a saturation time of said saturable current transformer in said inverter circuit means, and including an impedance variable circuit means for controlling a current in said control winding by varying an impedance in said impedance variable circuit means to vary the impedance in said saturable current transformer and therefore an output of said inverter circuit means.

2. The discharge lamp assembly according to claim 1, wherein said impedance variable circuit means, has a soft start function, for varying a saturation time of said saturable current transformer for a predetermined time period after said discharge lamp started and for lowering an output of said inverter circuit means.

3. The discharge lamp assembly according to claim 2, wherein said output variable circuit means includes constant output circuit means for varying a saturation time of said saturable current transformer in accordance with a voltage supplied from said power supply to make an output of said inverter circuit means constant.

4. The discharge lamp assembly according to claim 3, further comprising dimmed light switching circuit means for varying an output of said output variable circuit means and fulllight start circuit means which, when said discharge lamp is started, causes an output of said inverter circuit means not to be lowered even if said dimmed light switch circuit means is activated.

5. The apparatus according to claim 1, further comprising a plurality of discharge lamps connected in a parallel array.

6. A discharge lamp assembly for operating a discharge lamp comprising:
   a self-excited inverter circuit means comprising:
   a DC power supply,
   a feedback-controlled, saturable current transformer having a primarily winding, and secondary windings, and a control winding, and
   a plurality of switching elements having control electrodes connected to said secondary windings and current conducting electrodes connected between said DC power supply and said primary winding to alternately conduct in response to outputs of said secondary windings;
   aid self-excited inverter circuit means for converting a direct current to an alternating current;
   a discharge lamp connected to an AC output from said inverter circuit means; and
   an output variable circuit means, connected to said control winding, for varying a current in said control winding to vary a saturation time of said saturable current transformer in said inverter circuit means, and including an impedance variable circuit means for controlling a current in said control winding by varying an impedance in said impedance variable circuit means to vary the impedance in said saturable current transformer and therefore an output of said inverter circuit means,
   said impedance variable circuit means comprises:
   a voltage dividing resistor connected to an output terminal of said DC power supply of a rectifier circuit to be coupled to said control winding, and
   a transistor connected between the voltage dividing resistor and an output of said inverter circuit means.

* * * * *